US006630021B2

(12) United States Patent
Reddy et al.

(10) Patent No.: US 6,630,021 B2
(45) Date of Patent: Oct. 7, 2003

(54) CEMENTING CASING STRINGS IN DEEP WATER OFFSHORE WELLS

(75) Inventors: B. Raghava Reddy, Duncan, OK (US); Russell M. Fitzgerald, Waurika, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/213,772

(22) Filed: Aug. 7, 2002

(65) Prior Publication Data

US 2003/0006038 A1 Jan. 9, 2003

Related U.S. Application Data

(60) Division of application No. 09/789,428, filed on Feb. 21, 2001, now Pat. No. 6,454,004, which is a continuation-in-part of application No. 09/501,337, filed on Feb. 9, 2000, now Pat. No. 6,273,191, which is a continuation-in-part of application No. 09/353,676, filed on Jul. 15, 1999, now Pat. No. 6,336,505.

(51) Int. Cl.[7] .......................... C04B 24/06; E21B 33/14
(52) U.S. Cl. .................. 106/809; 106/639; 106/677; 106/678; 106/724; 106/725; 106/726; 106/728; 106/802; 106/808; 106/810; 106/823; 166/293; 507/202; 507/260
(58) Field of Search .................. 106/724, 728, 106/802, 808, 810, 823, 639, 677, 678, 725, 726, 809; 166/293; 507/202, 260

(56) References Cited

U.S. PATENT DOCUMENTS

| | | | |
|---|---|---|---|
| 3,359,225 A | 12/1967 | Weisend | 260/29.6 |
| 3,844,351 A | 10/1974 | Sutton et al. | 166/293 |
| 3,926,650 A | 12/1975 | Lange et al. | 106/90 |
| 3,937,282 A | 2/1976 | Shryock et al. | 166/293 |
| 4,028,125 A | 6/1977 | Martin | 106/89 |
| 4,160,674 A | 7/1979 | Sawyer | 106/89 |
| 4,304,298 A | 12/1981 | Sutton | 166/293 |
| 4,415,366 A | 11/1983 | Copening | 106/86 |
| 4,466,833 A | 8/1984 | Spangle | 106/88 |
| 4,482,379 A | 11/1984 | Dibrell et al. | 106/76 |
| 4,557,763 A | 12/1985 | George et al. | 106/90 |
| 4,676,832 A | 6/1987 | Childs et al. | 106/90 |
| 4,761,183 A | 8/1988 | Clarke | 106/117 |
| 4,846,888 A | 7/1989 | Detroit | 106/93 |
| 5,016,711 A | 5/1991 | Cowan | 166/250 |
| 5,049,288 A | 9/1991 | Brothers et al. | 252/8.551 |
| 5,071,484 A | 12/1991 | Bonifay et al. | 106/692 |
| 5,086,850 A | 2/1992 | Harris et al. | 175/61 |
| 5,121,795 A | 6/1992 | Ewert et al. | 166/292 |
| 5,123,487 A | 6/1992 | Harris et al. | 166/277 |
| 5,125,455 A | 6/1992 | Harris et al. | 166/292 |
| 5,127,473 A | 7/1992 | Harris et al. | 166/277 |
| 5,133,409 A | 7/1992 | Bour et al. | 166/293 |
| 5,147,565 A | 9/1992 | Bour et al. | 252/8.551 |
| 5,284,512 A | 2/1994 | Koskan et al. | 106/416 |
| 5,340,860 A | 8/1994 | Brake et al. | 524/166 |
| 5,346,550 A | 9/1994 | Kunzi et al. | 106/709 |
| 5,447,198 A | 9/1995 | Kunzi et al. | 166/293 |
| 5,484,019 A | 1/1996 | Griffith | 166/293 |
| 5,569,324 A | 10/1996 | Totten et al. | 106/696 |
| 5,571,318 A | 11/1996 | Griffith et al. | 106/725 |
| 5,580,378 A | 12/1996 | Shulman | 106/677 |
| 5,588,489 A | 12/1996 | Chatterji et al. | 166/293 |
| 5,688,844 A | 11/1997 | Chatterji et al. | 524/8 |
| 5,696,059 A | 12/1997 | Onan et al. | 507/269 |
| 5,705,599 A | 1/1998 | Felixberger et al. | 528/227 |
| 5,711,801 A | 1/1998 | Chatterji et al. | 106/789 |
| 5,806,594 A | 9/1998 | Stiles et al. | 166/293 |
| 5,820,670 A | 10/1998 | Chatterji et al. | 106/727 |
| 5,876,623 A | 3/1999 | Tang et al. | 252/180 |
| 5,897,699 A | 4/1999 | Chatterji et al. | 106/678 |
| 5,908,885 A | 6/1999 | Sikes et al. | 524/5 |
| 6,019,835 A | 2/2000 | Chatterji et al. | 106/725 |
| 6,063,738 A | 5/2000 | Chatterji et al. | 507/269 |
| 6,133,347 A | 10/2000 | Vickers, Jr. et al. | 524/8 |
| 6,136,950 A | 10/2000 | Vickers, Jr. et al. | 528/363 |
| 6,145,591 A | 11/2000 | Boncan et al. | 166/291 |
| 6,153,673 A | 11/2000 | Lemos et al. | 524/5 |
| 6,174,980 B1 | 1/2001 | Hirata et al. | 526/320 |
| 6,182,758 B1 | 2/2001 | Vijn | 166/293 |
| 6,220,354 B1 | 4/2001 | Chatterji et al. | 166/293 |
| 6,227,294 B1 | 5/2001 | Chatterji et al. | 166/293 |
| 6,273,191 B1 | 8/2001 | Reddy et al. | 166/293 |
| 6,336,505 B1 * | 1/2002 | Reddy | 166/293 |
| 6,419,016 B1 * | 7/2002 | Reddy | 166/293 |
| 6,454,004 B2 * | 9/2002 | Reddy et al. | 166/293 |
| 2003/0006038 A1 * | 1/2003 | Reddy et al. | 166/293 |

FOREIGN PATENT DOCUMENTS

| | | | | |
|---|---|---|---|---|
| EP | 0 204 370 A1 | 12/1986 | | C04B/24/16 |
| EP | 0 816 300 A2 | 1/1998 | | C04B/28/04 |
| EP | 1 069 091 A1 | 1/2001 | | C04B/28/04 |
| EP | 1 123 907 A2 | 8/2001 | | C04B/28/02 |
| EP | 1 238 952 A1 | 9/2002 | | C04B/28/02 |
| WO | WO 00/00536 | 1/2000 | | C08G/81/00 |
| WO | WO 00/09459 | 2/2000 | | C04B/28/02 |
| WO | WO 00/09460 | 2/2000 | | C04B/28/02 |
| WO | WO 00/35965 | 6/2000 | | C08F/8/32 |

OTHER PUBLICATIONS

Publication entitled *Cementing* by Dwight K. Smith, Second Printing 1990, pp. 18–20. (No month).

Donlar® Higher Molecular Weight Polymers Technical Bulletin dated Apr. 24, 1998.

Donalr® Low Molecular Weight Polymers Technical Bulletin dated Apr. 24, 1998.

* cited by examiner

*Primary Examiner*—Anthony J. Green
(74) *Attorney, Agent, or Firm*—Craig W. Roddy; C. Clark Dougherty, Jr.

(57) ABSTRACT

The present invention provides improved compositions and methods for cementing casing strings in deep water offshore formations penetrated by well bores. The cement composition basically comprises hydraulic cement, water, an environmentally degradable water reducing and dispersing additive, an environmentally degradable set retarding additive and an environmentally degradable compressive strength and set accelerating additive.

20 Claims, No Drawings

CEMENTING CASING STRINGS IN DEEP WATER OFFSHORE WELLS

CROSS-REFERENCE TO RELATED APPLICATIONS

This application is a divisional of application Ser. No. 09/789,428 filed Feb. 21, 2001, U.S. Pat. No. 6,454,004, which is a continuation-in-part of application Ser. No. 09/501,337 filed Feb. 9, 2000, U.S. Pat. No. 6,273,191, which is a continuation-in-part of application Ser. No. 09/353,676 filed Jul. 15, 1999, U.S. Pat. No. 6,336,505.

BACKGROUND OF THE INVENTION

1. Field of the Invention

The present invention relates to cement compositions containing environmentally degradable additives and methods of cementing in subterranean zones therewith, and more particularly, to such cement compositions and methods of using the compositions for cementing conductor or surface casing strings in deep water offshore wells.

2. Description of the Prior Art

In carrying out completion operations in oil and gas wells, hydraulic cement compositions are commonly utilized. For example, hydraulic cement compositions are used in primary cementing operations whereby casing strings are cemented in well bores. That is, a hydraulic cement composition is pumped into the annular space between the walls of a well bore and the exterior of a casing string disposed therein. The cement composition is permitted to set in the annular space thereby forming an annular sheath of hardened impermeable cement therein. The objective of the cement sheath is to physically support and position the casing string in the well bore and bond the casing string to the walls of the well bore whereby the undesirable migration of fluids between zones or formations penetrated by the well bore is prevented.

Primary cementing operations in deep water offshore wells are particularly difficult in that they are carried out in well bores which penetrate formations between the sea floor or mud line and a depth generally under about 2,000 feet below the mud line. Such formations are often not well consolidated, readily fracture and often have highly pressured water flows therethrough. For example, the fracture gradients in subsea well bores in which conductor and/or surface casing strings are cemented limit the densities of the cement compositions utilized to 11 or 12 pounds per gallon. The high water flows through the well bores often wash away cement compositions which have densities below 10 to 11 pounds per gallon.

Another problem involved in deep water offshore well cementing is the temperature at which the cement composition must set. Deep water offshore wells typically have sea bottom temperatures ranging from about 32° F. to 55° F. depending on the geographical location. The cement compositions utilized for performing cementing operations at such temperatures must set and provide enough compressive strength to proceed with drilling without involving long waiting-on-cement (WOC) times, preferably less than 24 hours. Accordingly, the cement compositions must include set and strength accelerating agents to allow the cement compositions to set at the low temperatures involved and develop early compressive strengths. However, a problem in the use of set and strength accelerating agents is that they often cause the cement compositions to have thickening times which are too short to allow placement of the cement compositions in the formations or zones to be cemented. Thus, the cement compositions used in deep offshore wells must have adequate pumping times to allow placement, but at the same time they must set and develop sufficient compressive strengths to allow further drilling as quickly as possible. The generally accepted requirements for cement compositions to overcome the above described problems in the Gulf Coast region of the United States include cement composition densities in the range of from 10 to 12 pounds per gallon, thickening times of from 3 to 5 hours and compressive strengths of from 400 to 600 psi at temperatures of from about 45° F. to about 55° F.

Foamed cement compositions have heretofore been utilized in deep water offshore wells to obtain the low densities required. Set and strength accelerating agents such as calcium chloride have also been used to provide short thickening times at the low temperatures involved. To obtain the required compressive strengths at the low temperatures, cement blends containing at least two different cements have heretofore been used. For example, U.S. Pat. No. 5,571,318 issued to Griffith et al. on Nov. 5, 1996 discloses cementing compositions for use in cold environments which are comprised of a relatively coarse particulate hydraulic cement mixed with an ultra fine particulate hydraulic cement. U.S. Pat. No. 5,806,594 issued to Stiles et al. on Sep. 15, 1998 discloses foamed cement compositions containing calcium sulfate cement and Portland cement.

API oil well cements are generally used in deep water offshore wells, and frequently, different classes of such cements must be used for cementing at different depths due to the temperature differences. The use of two or more different cements, for whatever purpose in drilling an offshore well, requires multiple cleanings of the bulk cement tanks located at the drilling rig platform as well as numerous trips to on-shore blending facilities for transporting the different cements to the platform. Thus, there is a need for a cement composition containing a single cement which can be used for cementing at various depths in an offshore well. The use of such a cement composition would be highly economical as well as environmentally preferable.

Another problem associated with offshore wells involves the use of dry additives such as set and compressive strength accelerating agents, set retarders, dispersing agents and the like in the cement compositions used. The use of dry additives requires the cement to be dry blended with the dry additives on-shore and the resulting blend to be transferred to the offshore platform where the dry blend is mixed with seawater. The blends can generally be used only for cementing at certain depths due to the differences in temperatures, fracture gradients and water flows. As a result, unused portions of specific cement blends have to be discarded and replaced with newly prepared blends. Again, this procedure wastes time and money in that it involves additional trips between the on-shore blending facility and the drilling platform. etc.

Thus, if only one basic cement is utilized and if the various additives are added in liquid form to the mix water or slurry on the offshore platform just prior to cementing, the bulk-cement inventory will be limited to one dry cement on the platform that can be used throughout the completion of the well, decisions on the precise nature of the cement composition to be used can be deferred until it is time to begin the cementing process and the operator will use only as much cement and liquid additives needed without generating costly waste and lost time.

Another problem which has often heretofore been encountered in deep water offshore well cementing is the inflow of formation fluids, e.g., water, gas and/or oil, into a cement composition which has been placed in the annulus between a casing string and the walls of a well bore, but which has not yet set. Such inflow of formation fluids is generally caused by the cement composition becoming partially self-supporting and the consequent loss of the ability of the cement column in the annulus to transmit hydrostatic pressure. When the pressure exerted by the cement composition falls below the pressure of formation fluids, the formation fluids enter the annulus and flow through the cement composition whereby flow channels are formed therein which remain after the cement composition is completely set. The loss of the ability of the cement column to transmit hydrostatic pressure can result from the cement composition having too long a transition time, i.e., the time interval between when the cement composition begins to develop static gel strength and when the cement composition has sufficient gel strength to prevent the inflow of formation fluids. At the low temperatures encountered in offshore wells, it has heretofore been difficult if not impossible to shorten the transition times of cement compositions enough to eliminate formation fluid inflow and the problems associated therewith. Thus, there are needs for improved cement compositions and methods of cementing casing strings in offshore well bores using the cement compositions whereby formation fluid inflow is prevented.

Another problem encountered in offshore well cementing involves the use of additives such as water reducing agents, dispersing agents, foaming and foam stabilizing surfactants, set retarding agents and the like which are not environmentally degradable. That is, when cement composition additives which are not fully degradable in the environment are utilized in offshore applications they find their way into the seawater and interfere with aquatic life cycles therein. Thus, there are needs for improved well cement compositions containing environmentally degradable additives and methods of using the compositions in offshore well applications.

SUMMARY OF THE INVENTION

The present invention provides improved cement compositions containing environmentally degradable additives and methods of cementing casing strings in offshore formations penetrated by well bores which meet the needs described above and overcome the deficiencies of the prior art. The improved cement compositions of the invention are basically comprised of a single hydraulic cement, sufficient water to form a pumpable slurry, a water reducing and dispersing additive comprised of polyaspartic acid, a set retarding additive comprised of a lignosulfonate salt, and a compressive strength and set accelerating additive comprised of a water soluble calcium salt.

Depending on the temperature of the well being cemented and the level of tricalcium aluminate in the particular hydraulic cement used, additional calcium aluminate can be included in the cement composition to help shorten the cement composition transition time. When a low density cement composition must be used to prevent fractures from being formed in subterranean formations penetrated by the well bore, the above described cement composition can be foamed, i.e., it can include a gas in an amount sufficient to foam the cement composition and a cement composition foaming and foam stabilizing additive comprised of hydrolyzed keratin in an effective amount. With the exception of the cement and the gas utilized to foam the cement composition, all of the other components of the cement composition can be in liquid form.

The methods of this invention basically comprise the steps of preparing a cement composition of the invention; placing the cement composition in the annulus between a casing string and a well bore; and allowing the cement composition to set into a hard impermeable mass therein.

It is, therefore, a general object of the present invention to provide improved well cement compositions containing environmentally degradable liquid additives and methods of cementing casing strings in wells using the compositions.

A further object of the present invention is the provision of methods of cementing casing strings in deep water offshore wells utilizing cement compositions comprised of a single hydraulic cement, water and liquid additives which can all be added to the mix water or cement slurry and which are environmentally degradable.

Other and further objects, features and advantages of the present invention will be readily apparent to those skilled in the art upon a reading of the description of preferred embodiments which follows.

DESCRIPTION OF PREFERRED EMBODIMENTS

The present invention provides improved well cement compositions containing environmentally degradable additives and methods of cementing a casing string in a deep water offshore formation or zone penetrated by a well bore using the cement compositions. The cement compositions are comprised of a single hydraulic cement, water and additives which are all environmentally degradable and which can all be added to the water or cement slurry in liquid form. The cement compositions of this invention can be utilized over a broad temperature range, e.g., from about 32° F. to about 80° F. by simply changing the weight ratio and quantities of certain of the components in the compositions. Further, the cement compositions can meet the generally accepted requirements for cementing casing strings in deep water offshore wells, namely, a cement composition density in the range of from 10 to 12 pounds per gallon, a thickening time of from 3 to 5 hours and compressive strengths of from 400 psi to 600 psi at 45° F. to 55° F. The methods allow the operator of an offshore platform to keep a single dry cement in bulk storage on the platform along with the other components of the cement composition which except for the gas utilized to foam the composition can all be in liquid form. The liquid additives can be added to the water or the single cement slurry just prior to cementing whereby the operator uses only as much dry cement and liquid components as are needed without generating waste and losing time by changing cements, etc.

As mentioned, the well cement compositions and methods of the present invention are particularly suitable for cementing conductor and/or surface casing strings in deep water offshore formations or zones penetrated by well bores. The cement compositions of the invention can be used in shallow high water flow formations in which conductor and/or surface casing strings are cemented as well as in the deeper, warmer formations in which other casing strings or liners are cemented. Generally, the cementing compositions of this invention can be utilized for cementing wells at depths from 0 to 8,000 feet or deeper.

The improved well cement compositions of this invention which contain environmentally degradable additives are basically comprised of a single hydraulic cement, sufficient water to form a pumpable slurry, a water reducing and dispersing additive comprised of polyaspartic acid, a set retarding additive comprised of a lignosulfonate salt and a compressive strength and set accelerating additive comprised of a water soluble calcium salt.

Depending on the temperature of the well being cemented and the level of tricalcium aluminate in the hydraulic cement used, additional calcium aluminate can be included in the cement composition to help shorten the cement composition transition time. When a low density cement composition must be used to prevent fractures from being formed in subterranean formations penetrated by the well bore, the above described cement composition can be foamed, i.e., it can include a gas in an amount sufficient to foam the cement composition and a cement composition foaming and foam stabilizing additive comprised of hydrolyzed keratin. With the exception of the cement and the gas used to foam the cement composition, all of the other components of the cement composition can be in liquid form.

The water reducing and dispersing additive, the set retarding additive and the cement compressive strength and set accelerating additive are present in amounts such that the cement composition has a required thickening time, generally in the range of from about 3 to about 5 hours, and develops adequate compressive strength, generally in the range of from about 400 psi to about 600 psi, at a temperature in the range of from about 45° F. to about 55° F. within a time period of 24 hours or less.

As mentioned above, the aqueous cement compositions formed with Portland or equivalent hydraulic cements can be made to have very short transition times (sometimes referred to as "right angle set cement compositions") by including calcium aluminate in the cement compositions. Further, if the hydraulic cement used is not one of the high activity types, but instead is a low activity cement having a low content of tricalcium aluminate, calcium aluminate or one or more alkali metal aluminates can be added to the cement to achieve a short transition time. Calcium aluminate has the general formula $(CaO)_n(Al_2O_3)_m$ where the values of m and n are such that the amount of CaO in the calcium aluminate can vary from about 20% to about 40% by weight and the amount of the $Al_2O_3$ can vary from about 60% to about 80% by weight. Commercial calcium aluminates can also contain varying amounts of metal oxide impurities.

The methods of this invention for cementing a casing string in a deep water offshore formation penetrated by a well bore are comprised of the following steps. A cement composition of this invention is prepared, the prepared cement composition is placed in the annulus between the walls of the well bore and a casing string disposed therein and the cement composition is allowed to set into a hard impermeable mass therein.

The cement water reducing and dispersing additive and the cement set retarding additive work together to reduce the amount of water in the cement composition and retard the set of the composition. The amount of compressive strength and set accelerating additive in the composition moderates the set retardation. The additives also function to de-agglomerate the hydraulic cement in the composition, i.e., to break up agglomerated cement particles in the composition into separate particles which increases the cement surface area whereby the cement hydrates faster and provides early cement composition compressive strength at low temperatures.

When a low density cement composition is required, a gas in an amount sufficient to form a foam and a cement composition foaming and foam stabilizing additive are included in the above described cement composition. Also, as mentioned above, if the hydraulic cement used is a low activity cement or if a very short transition time is required, calcium aluminate or one or more alkali metal aluminates can be added to the cement composition together with the other additives described above to bring about the desired short transition time.

The single hydraulic cement preferred for use in accordance with this invention is one of API Classes A, C, H and G Portland or equivalent hydraulic cements. The above mentioned API cements are defined and described in *API Specification For Materials And Testing For Well Cements*, API Specification 10, Fifth Edition, dated Jul. 1, 1990 of the American Petroleum Institute. The API Portland cements, or other cements which are equivalent thereto, are suitable for cementing deep water offshore wells from 0 to 8,000 feet when used with the additives of this invention and the additives are all environmentally degradable whereby they do not harm the environment.

The water in the cement compositions can be fresh water or salt water. The term "salt water" is used herein to mean unsaturated salt solutions and saturated salt solutions including brines and seawater. The water is generally present in the cement compositions in an amount sufficient to form a pumpable slurry, and more specifically, in an amount in the range of from about 30% to about 40% by weight of cement in the cement compositions.

The polyaspartic acid water reducing and dispersing additive is environmentally degradable and functions to allow the use of small amounts of water in the cement composition as well as to disperse the cement particles in the water to produce a useful slurry at low water concentrations. The polyaspartic acid used preferably has a molecular weight in the range of from about 500 to about 60,000 and is dissolved in water in an amount of about 40% by weight of the resulting solution. The aqueous polyaspartic acid solution is included in the cement composition in an amount in the range of from about 0.5% to about 5% by weight of the cement in the composition (the polyaspartic acid is present in an amount in the range of from about 0.2% to about 2% by weight of cement in the composition). Particularly suitable polyaspartic acids are sodium polyaspartate polymers commercially available from Donlar Corporation, Bedford Park, Ill., under the tradename designations Donlar®A-2C, Donlar®A-3C and Donlar®C-50D.

The lignosulfonate salt set retarding additive is also environmentally degradable and functions to increase the thickening time of the cement composition so that it remains pumpable for a sufficient time to be placed in the subterranean zone to be cemented. Useful lignosulfonate salts include sodium lignosulfonate, calcium lignosulfonate and ammonium lignosulfonate with sodium lignosulfonate being preferred. The lignosulfonate salt is preferably dissolved in water in an amount of about 33% by weight of the resulting solution. The aqueous lignosulfonate salt solution is included in the cement composition in an amount in the range of from about 0.05% to about 0.5% by weight of the cement in the composition (the lignosulfonate salt is present in an amount in the range of from about 0.0165% to about 0.165% by weight of cement in the composition).

While a variety of cement compressive strength and set accelerating additives can be utilized in the cement compositions of this invention, a water soluble calcium salt such as calcium chloride, calcium nitrite and calcium formate is preferred with calcium chloride being the most preferred. The compressive strength and set accelerating additive is also preferably dissolved in fresh water so that it can be added to the mix water or cement slurry on location. Most preferably, the set accelerating additive is in the form of an aqueous solution wherein the compressive strength and set accelerating additive is present therein in an amount of about 33% by weight of the solution. The aqueous compressive strength and set accelerating additive solution is included in the cement composition in an amount in the range of from about 1% to about 12% by weight of cement in the composition (the additive is present in an amount in the range of from about 0.33% to about 4% by weight of cement in the composition.

When a cement composition of this invention is foamed, the gas utilized can be air or nitrogen, with nitrogen being preferred. The gas is generally present in an amount sufficient to foam the cement composition to a density in the range of from about 10 to about 12 pounds per gallon.

Various foaming and foam stabilizing additives which are environmentally degradable can be utilized in accordance with this invention. A preferred such environmentally degradable additive is hydrolyzed keratin. Keratin is the structural protein of epithelial cells in the outermost layers of skin. Hydrolyzed keratin is manufactured by the base hydrolysis of hoof and horn meal. That is, the hoof and horn meal is heated with lime in an autoclave to produce a hydrolyzed protein. The amino acid content, i.e., the number of gram molecules of amino acid per 1000 grams of protein, is as follows: Lysine-6.2; Histidine-19.7; Arginine-56.9; Aspartic Acid[1]-51.5; Threonine-55.9; Serine-79.5; Glutamic Acid-99; Proline-58.3; Glycine-78; Alanine-43.8; Half cystine-105; Valine-46.6; Methionine-4; Isoleucine-29; Leucine-59.9; Tryosine-28.7; Phenylalanine-22.4; Hydroxyproline-12.2; Hydroxylsine-1.2; Total-863; Average residual weight-117. The protein is commercially available as a free flowing powder that contains about 85% protein.

[1] The values of aspartic and glutamic acid include aspargine and glutamine, respectively.

The non-protein portion of the powder consists of about 0.58% insoluble material with the remainder being soluble non-protein materials primarily made up of calcium sulfate, magnesium sulfate and potassium sulfate. As mentioned above, hydrolyzed keratin is environmentally degradable and harmless to the environment. The hydrolyzed keratin protein powder is preferably predissolved in fresh water in an amount of about 50% by weight of the solution. Hydrolyzed keratin is preferably included in a foamed cement composition of this invention in an amount in the range of from about 1% to about 5% by volume of the water in the foamed cement composition (from about 2% to about 10% of a 50% by weight solution of the hydrolyzed keratin).

Another environmentally degradable foaming and foam stabilizing additive that can be utilized in accordance with this invention is a mixture of a ethoxylated alcohol ether sulfate of the formula $$H(CH_2)_a(OC_2H_4)_bOSO_3NH_4^+$$

Wherein a is an integer in the range of from about 6 to about 10 and b is an integer in the range of from about 3 to about 10; an alkyl or alkene amidopropyl betaine having the formula $$R\text{---}CONHCH_2CH_2CH_2N^+(CH_3)_2CH_2CO_2^-$$

wherein R is a radical selected from the group of decyl, cocoyl, lauryl, cetyl and oleyl; and an alkyl or alkene amidopropyl dimethyl amine oxide having the formula $$R\text{---}CONHCH_2CH_2CH_2N^+(CH_3)_2O^-$$

wherein R is a radical selected from the group of decyl, cocoyl, lauryl, cetyl and oleyl.

The ethoxylated alcohol ether sulfate is generally present in the above described mixture in an amount in the range of from about 60 to 64 parts by weight. The alkyl or alkene amidopropyl betaine is generally present in the additive in an amount in the range of from about 30 to about 33 parts by weight and the alkyl or alkene aminopropyl dimethyl amine oxide is generally present in the additive in an amount in the range of from about 3 to about 10 parts by weight. The surfactant mixture is preferably combined with fresh water in an amount of about 50% by weight of the solution.

A particularly suitable mixture of the above described foaming and foam stabilizing surfactants is comprised of ethoxylated alcohol ether sulfate present in the mixture in an amount of about 63.3 parts by weight; the alkyl or alkene amidopropyl betaine is cocoylamidopropyl betaine and is present in the mixture in an amount of about 31.7 parts by weight; and the alkyl or alkene amidopropyl dimethylamine oxide is cocoylamidopropyl dimethylamine oxide and is present in the mixture in an amount of about 5 parts by weight. The mixture of foaming and foam stabilizing surfactants is generally included in a foamed cement composition of this invention in an amount in the range of from about 1% to about 5% by volume of the water in the foamed cement composition (from about 2% to about 10% of a 50% by weight solution of said mixture of surfactants).

The foamed cement slurries of this invention may be prepared in accordance with any of the mixing techniques utilized in the art. In one preferred method, a quantity of water is introduced into a cement blender followed by the liquid additives other than the foaming and foam stabilizing additive followed by the hydraulic cement utilized. The mixture is agitated for a sufficient period of time to form a pumpable non-foamed slurry. The slurry is then pumped to the well bore, and the liquid foaming and foam stabilizing additive followed by the gas utilized are injected into the slurry on the fly. As the slurry and gas flow through the well bore to the location where the foamed cement composition is to be placed, the slurry is foamed.

As mentioned, the water reducing and dispersing additive, the set retarding additive and the compressive strength and set accelerating additive are present in amounts such that the cement composition has a thickening time of from about 3 to about 5 hours and a compressive strength from about 400 psi to about 600 psi at temperatures in the range of from about 45° F. to about 55° F. within 24 hours.

As will be understood by those skilled in the art, in specific applications and at specific depths in deep water offshore wells, other additives, preferably in liquid form, which are well known to those skilled in the art and which do not adversely affect the required properties of the cement composition can be included therein. Examples of such additives include but are not limited to fluid loss control additives, viscosifying agents, thixotropic agents and anti-settling agents.

A method of the present invention for cementing a casing string or the like in a well bore is comprised of the steps of: (a) preparing a cement composition comprised of a single hydraulic cement, sufficient water to form a pumpable slurry, a water reducing and dispersing additive, a set retarding additive and a compressive strength and set accelerating additive, said additives being environmentally degradable and being present in amounts such that the cement composition has a required thickening time in the range of from about 3 to about 5 hours, and develops compressive strength in the range of from about 400 psi to about 600 psi at a temperature in the range of from about 45° F. to about 55° F. within 24 hours or less; (b) placing the cement composition in the annulus between the casing string and the well bore; and (c) allowing the cement composition to set into a hard impermeable mass therein.

Another method of the present invention which is particularly suitable for cementing a casing string in a deep water offshore formation or zone penetrated by a well bore is comprised of the steps of: (a) preparing a cement composition comprised of a single hydraulic cement, sufficient water to form a pumpable slurry, a gas present in an amount sufficient to form a foam, a liquid cement composition foaming and foam stabilizing additive present in an effective amount, a liquid water reducing and dispersing additive, and a liquid compressive strength and set accelerating additive, said additives being environmentally degradable and being present in said composition in amounts such that the cement composition has a thickening time in the range of from about 3 to about 5 hours, and develops compressive strength in the range of from about 400 psi to about 600 psi at a temperature in the range of from about 45° F. to about 55° F. within 24 hours; (b) placing the cement composition in the annulus between the casing string and the well bore; and (c) allowing the cement composition to set into a hard impermeable mass therein.

Yet another method of the present invention for cementing a casing string in a deep water offshore formation penetrated by a well bore at a temperature in the range of from 32° F. to about 80° F. comprises the steps of: (a) preparing a cement composition comprised of a single hydraulic cement comprised of Portland cement, sufficient water to form a pumpable slurry, a gas present in an amount sufficient to form a foam, a liquid environmentally degradable cement composition foaming and foam stabilizing additive comprised of hydrolyzed keratin or a mixture of surfactants comprised of 63.3 parts by weight of ethoxylated alcohol ether sulfate, 31.7 parts by weight of cocoylamidopropyl betaine and 5 parts by weight of cocoylamidopropyl dimethylamine oxide present in an effective amount, a liquid environmentally degradable water reducing and dispersing additive comprised of polyaspartic acid, a liquid environmentally degradable set retarding additive comprised of sodium lignosulfate and a liquid environmentally degradable compressive strength and set accelerating additive comprised of calcium chloride, said additives being present in amounts such that the cement composition has a thickening time in the range of from about 3 to about 5 hours and develops a compressive strength of at least about 400 psi within 24 hours; (b) pumping the cement composition into the annulus between the casing string and the well bore; and (c) allowing the cement composition to set into a hard impermeable mass therein.

Still another method of the present invention for cementing a casing string in a deep water offshore formation or zone penetrated by a well bore is comprised of the steps of: (a) preparing a cement composition comprised of a hydraulic cement, sufficient water to form a pumpable slurry, a gas present in an amount sufficient to form a foam, a liquid environmentally degradable cement composition foaming and foam stabilizing additive comprised of hydrolyzed keratin or a mixture of surfactants comprised of 63.3 parts by weight of ethoxylated alcohol ether sulfate, 31.7 parts by weight of cocoylamidopropyl betaine and 5 parts by weight of cocoylamidopropyl dimethylamine oxide present in an amount in the range of from about 1% to about 5% by volume of water in the composition, a liquid environmentally degradable water reducing and dispersing additive comprised of polyaspartic acid present in an amount in the range of from about 0.5% to about 5% by weight of cement in the composition, a liquid environmentally degradable set retarding additive comprised of sodium lignosulfonate present in an amount in the range of from about 0.05% to about 0.5% by weight of cement in the composition and a liquid environmentally degradable compressive strength and set accelerating additive comprised of calcium chloride present in an amount in the range of from about 1% to about 12% by weight of cement in the composition; (b) pumping the cement composition into the annulus between the casing and the well bore; and (c) allowing the cement composition to set into a hard impermeable mass therein.

Calcium aluminate or one or more alkali metal aluminates can optionally be included in the cement compositions of the above described methods in an amount in the range of from about 0.5% to about 5% by weight of hydraulic cement in the composition to shorten the transition time of the cement composition.

In order to further illustrate the methods of the present invention, the following example is given.

EXAMPLE

Foamed cement compositions were prepared comprised of Portland Class A hydraulic cement, sufficient water to form a pumpable slurry, air present in an amount sufficient to form a foam, a liquid environmentally degradable cement composition foaming and foam stabilizing additive comprised of a mixture of ethoxylated alcohol ether sulfate, cocoylamidopropyl betaine and cocoylamidopropyl dimethylamine oxide, a liquid environmentally degradable water reducing and dispersing additive comprised of polyaspartic acid of two different molecular weights, a liquid environmentally degradable set retarding additive comprised of sodium lignosulfonate and a liquid environmentally degradable compressive strength and set accelerating additive comprised of calcium chloride. The various foamed cement compositions were tested for thickening time and compressive strengths in accordance with the procedures set forth in the above mentioned API Specification 10. The components of the various cement compositions and their amounts are given in the Table below along with the test results.

TABLE

Thickening Times And Compressive Strengths Of Foamed Cement Compositions

| Test Cement Composition No. | Synthetic Sea Water | Liquid Foaming And Foam Stabilizing Additive,[1] % by volume of water | Liquid Water Reducing And Dispersing Additive,[2] % by weight of cement | Liquid Set Retarding Additive,[3] % by weight of cement | Liquid Compressive Strength And Set Accelerating Additive,[4] % by weight of cement | Slurry Density, lb/gal | Foamed Density, lb/gal | Thickening Time, hrs:min | Compressive Strength @ 50° F., psi |
|---|---|---|---|---|---|---|---|---|---|
| 1 | 40 | 1 | — | — | — | 16.4 | 12 | 3:50 | — |
| 2 | 40 | 1 | 1(A) | — | — | 16.4 | 12 | 11:11 | — |
| 3 | 36 | 1 | 1(A) | — | 6 | 16.4 | 12 | 8:00 | — |

TABLE-continued

Thickening Times And Compressive Strengths Of Foamed Cement Compositions

| Test Cement Composition No. | Cement Composition Components | | | | | | | |
|---|---|---|---|---|---|---|---|---|
| | Synthetic Sea Water | Liquid Foaming And Foam Stabilizing Additive,[1] % by volume of water | Liquid Water Reducing And Dispersing Additive,[2] % by weight of cement | Liquid Set Retarding Additive,[3] % by weight of cement | Liquid Compressive Strength And Set Accelerating Additive,[4] % by weight of cement | Slurry Density, lb/gal | Foamed Density, lb/gal | Thickening Time, hrs:min | Compressive Strength @ 50° F., psi |
| 4 | 36 | 1 | 1(A) | — | 6 | 16.4 | 12 | 7:21 | — |
| 5 | 36 | 1 | 1(A) | — | 8 | 16.4 | 12 | 3:40 | 180 |
| 6 | 40 | 1 | 1(B) | — | — | 16.4 | 12 | 12:00 | — |
| 7 | 38 | 1 | 1(B) | — | 4 | 16.4 | 12 | 5:40 | — |
| 8 | 36 | 1 | 0.75(B) | — | 8 | 16.4 | 12 | 1:00 | — |
| 9 | 38 | 1 | 0.75(B) | 0.25 | 4 | 16.4 | 12 | 2:39 | — |
| 10 | 38 | 1 | 0.75(B) | 0.125 | 4 | 16.4 | 12 | 3:05 | — |
| 11 | 38 | 1 | 1(B) | 0.125 | 4 | 16.4 | 12 | 4:55 | 382 |
| 12 | 37 | 1 | 1.2(B) | 0.150 | 4.8 | 16.4 | 12 | — | 336 |

[1] 50% aqueous solution of a mixture of 63.3 parts by weight ethoxylated alcohol ether sulfate, 31.7 parts by weight cocoylamidopropyl betaine and 5 parts by weight cocoylamidopropyl dimethylamine oxide.
[2] 40% aqueous solution of polyaspartic acid having a molecular weight of (A) 3,000 or (B) 50,000
[3] 33% aqueous solution of sodium lignosulfonate
[4] 33% aqueous solution of calcium chloride From the above Table it can be seen that the cement compositions containing environmentally degradable additives have properties suitable for cementing casing strings in deep water offshore wells.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A cement composition comprising:
a single hydraulic cement;
sufficient water to form a pumpable slurry;
an environmentally degradable water reducing and dispersing additive that comprises polyaspartic acid;
an environmentally degradable set retarding additive that comprises a lignosulfonate salt; and
an environmentally degradable compressive strength and set accelerating additive that comprises a water soluble salt.

2. The composition of claim 1 wherein said hydraulic cement is a Portland or equivalent cement.

3. The composition of claim 1 wherein said hydraulic cement is selected from the group consisting of API Classes A, C, H and G Portland cements.

4. The composition of claim 1 wherein said water is selected from the group consisting of fresh water and salt water present in an amount in the range of from about 30% to about 45% by weight of cement in said composition.

5. The composition of claim 1 wherein said water reducing and dispersing additive is polyaspartic acid present in an amount in the range of from about 0.2% to about 2% by weight of cement in said composition.

6. The composition of claim 1 wherein said set retarding additive is selected from the group consisting of sodium lignosulfonate, calcium lignosulfate and ammonium lignosulfonate and is present in an amount in the range of from about 0.0165% to about 0.165% by weight of cement in said composition.

7. The composition of claim 6 wherein said set retarding additive is sodium lignosulfonate.

8. The composition of claim 1 wherein said compressive strength and set accelerating additive is selected from the group of calcium chloride, calcium nitrite and calcium formate and is present in an amount in the range of from about 0.33% to about 4% by weight of cement in said composition.

9. The composition of claim 1 wherein said water reducing and dispersing additive, said set retarding additive and said compressive strength and set accelerating additive are present in amounts such that said cement composition has a thickening time in the range of from about 3 to about 5 hours, and a compressive strength from about 400 psi to about 600 psi at a temperature in the range of from about 45° F. to about 55° F. in 24 hours or less.

10. A foamed well cement composition comprising:
a single hydraulic cement;
sufficient water to form a pumpable slurry;
a gas present in an amount sufficient to form a foam;
an environmentally degradable foaming and foam stabilizing additive;
an environmentally degradable water reducing and dispersing additive that comprises polyaspartic acid;
an environmentally degradable set retarding additive that comprises a lignosulfonate salt; and
an environmentally degradable compressive strength and set accelerating additive that comprises a water soluble salt.

11. The composition of claim 10 wherein said hydraulic cement is a Portland or equivalent cement.

12. The composition of claim 10 wherein said hydraulic cement is selected from the group consisting of API Classes A, C, H and G Portland cements.

13. The composition of claim 10 wherein said water is selected from the group consisting of fresh water and salt water present in an amount in the range of from about 30% to about 45% by weight of cement in said composition.

14. The composition of claim 10 wherein said gas is selected from the group of air and nitrogen present in an amount sufficient to foam the cement composition to a density in the range of from about 10 to about 12 pounds per gallon.

15. The composition of claim 10 wherein said foaming and foam stabilizing additive is selected from the group consisting of hydrolyzed keratin and a mixture of 63.3 parts by weight of ethoxylated alcohol ether sulfate, 31.7 parts by weight of cocoylamidopropyl betaine and 5 parts by weight of cocoylamidopropyl dimethylamine oxide present in an amount in the range of from about 1% to about 5% by volume of water in said composition.

16. The composition of claim 10 wherein said water reducing and dispersing additive is polyaspartic acid present in an amount in the range of from about 0.2% to about 2% by weight of cement in said composition.

17. The composition of claim 10 wherein said set retarding additive is selected from the group consisting of sodium lignosulfonate, calcium lignosulfonate and ammonium lignosulfonate and is present in an amount in the range of from about 0.0165% to about 0.165% by weight of cement in said composition.

18. The composition of claim 17 wherein said set retarding additive is sodium lignosulfonate.

19. The composition of claim 10 wherein said compressive strength and set accelerating additive is selected from the group of calcium chloride, calcium nitrite and calcium formate and is present in an amount in the range of from about 0.33% to about 4% by weight of cement in said composition.

20. The composition of claim 10 wherein said water reducing and dispersing additive, said set retarding additive and said compressive strength and set accelerating additive are present in amounts such that said cement composition has a thickening time in the range of from about 3 to about 5 hours, and a compressive strength from about 400 psi to about 600 psi at a temperature in the range of from about 45° F. to about 55° F. in 24 hours or less.

* * * * *